(12) United States Patent
Mihály et al.

(10) Patent No.: US 10,798,644 B2
(45) Date of Patent: Oct. 6, 2020

(54) TECHNIQUE FOR INTERNET PROTOCOL ANCHOR RELOCATION

(71) Applicant: Telefonaktiebolaget LM Ericsson (publ), Stockholm (SE)

(72) Inventors: Attila Mihály, Dunakeszi (HU); György Miklós, Pilisborosjenö (HU)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 26 days.

(21) Appl. No.: 16/307,581

(22) PCT Filed: Jul. 4, 2016

(86) PCT No.: PCT/EP2016/065740
§ 371 (c)(1),
(2) Date: Dec. 6, 2018

(87) PCT Pub. No.: WO2018/006936
PCT Pub. Date: Jan. 11, 2018

(65) Prior Publication Data
US 2019/0208465 A1    Jul. 4, 2019

(51) Int. Cl.
| | |
|---|---|
| H04W 56/00 | (2009.01) |
| H04W 48/00 | (2009.01) |
| H04W 8/26 | (2009.01) |
| H04L 29/12 | (2006.01) |
| H04W 36/00 | (2009.01) |
| H04W 8/08 | (2009.01) |
| H04W 36/12 | (2009.01) |
| H04W 36/18 | (2009.01) |

(52) U.S. Cl.
CPC ........ H04W 48/17 (2013.01); H04L 61/2007 (2013.01); H04W 8/08 (2013.01); H04W 8/26 (2013.01); H04W 36/0016 (2013.01); H04W 36/12 (2013.01); H04W 36/18 (2013.01)

(58) Field of Classification Search
CPC ........ H04W 48/17; H04W 8/08; H04W 8/26; H04W 36/0016; H04W 36/12; H04W 36/18; H04L 61/2007
USPC ........................................... 370/329
See application file for complete search history.

(56) References Cited

U.S. PATENT DOCUMENTS

| | | | |
|---|---|---|---|
| 2013/0003697 A1* | 1/2013 | Adjakple | H04L 45/74 370/331 |
| 2014/0341109 A1* | 11/2014 | Cartmell | H04L 45/308 370/328 |

OTHER PUBLICATIONS

3rd Generation Partnership Project, "3rd Generation Partnership Project; Technical Specification Group Services and System Aspects; Study on Architecture for Next Generation System (Release 14)", Technical Report, 3GPP TR 23.799 V0.5.0, May 1, 2016, pp. 1-178, 3GPP, France.

Intel, "Baseline solution for service continuity with IP anchor relocation", SA WG2 Meeting #113AH, Sophia Antipolis, France, Feb. 23, 2016, pp. 1-4, S2-161082, 3GPP.

(Continued)

*Primary Examiner* — Sai Ming Chan
(74) *Attorney, Agent, or Firm* — Coats + Bennett, PLLC

(57) ABSTRACT

A system and method for IP POP change for a user equipment are described. The approach is taken of assigning a new IP POP to the user equipment in an ongoing packet data unit session, while maintaining packet data transmission in that session. The new IP POP is brought into commission in stages within the session, with the uplink path being moved and then the downlink path.

16 Claims, 8 Drawing Sheets

(56) References Cited

OTHER PUBLICATIONS

NTT DoCoMo, "Re-selection of user-plane path based on UE traffic analysis", SA WG2 Meeting #115, Nanjing, China, May 23, 2016, pp. 1-4, S2-163206, 3GPP.
Intel, "Baseline solution for service continuity with anchor relocation", SA WG2 Meeting #114, Sophia Antipolis, France, Apr. 11, 2016, pp. 1-8, S2-161802, 3GPP.
Iyengar, J., et al., "QUIC: A UDP-Based Secure and Reliable Transport for HTTP/2", Network Working Group Internet-Draft, Jun. 17, 2015, pp. 1-30, IETF.
3rd Generation Partnership Project, "LTE; General Packet Radio Service (GPRS) enhancements for Evolved Universal Terrestrial Radio Access Network (E-UTRAN) access (3GPP TS 23.4001 version 13.6.1 Release 13)", Technical Specification, ETSI TS 123 401 V13.6.1, May 1, 2016, pp. 1-367, ETSI, France.
Intel, "Solution for session management model", SA WG2 Meeting #114, Sophia Antipolis, France, Apr. 11, 2016, pp. 1-4, S2-161825, 3GPP.
Troan, O., et al., "IPv6 Multihoming without Network Address Translation", Internet Engineering Task Force (IETF), Request for Comments: 7157, Mar. 1, 2014, pp. 1-22, IETF.

* cited by examiner

TECHNIQUE FOR INTERNET PROTOCOL ANCHOR RELOCATION

TECHNICAL FIELD

The present disclosure generally relates to mobile networks, such as those that are being standardized in 3GPP (Third Generation Partnership Project). The present disclosure specifically relates to maintaining service between a user equipment (UE) and a core network entity as the UE changes the routing of its data connection from one Internet Protocol (IP) Point of Presence (POP) to another.

BACKGROUND

One of the key problems to solve for the next generation fifth generation (5G) networks is how to provide efficient user plane (UP) paths to the UEs. An efficient UP path requires in many cases the selection of an IP POP that is located geographically close to the UE. Example use cases are operator network off-load of Internet traffic or where the UE needs to access both the Internet and a local service, such as a mobile edge computing applications server.

The network needs to be able to handle the situation where a UE changes IP POP for some or all of the packet data connections of a UE. The change of IP POP should take place with the minimum impact on the packet data connection, e.g. with the minimum of interruption time and loss of packets. Change of IP POP is, for example, needed when the UE moves, in order to maintain the advantages of being connected to a local IP POP, or when the UE changes its activity to require higher data throughput, so that it is more appropriate to use a different IP POP.

FIG. 1 shows a possible solution for IP POP re-selection that could be adopted in a 5G setting that uses SIPTO (Selected IP Traffic Offload), where SIPTO is described in Section 4.3.15 of 3GPP TS 23.401 version 13.6.1 Release 13 of May 2016. FIG. 1 shows a user equipment 10 moving from an initial position to a new position, wherein the movement is indicated by the arrow. The core network has a user plane and a control plane. A packet data connection for the UE 10 to an Internet application server 16 is provided through the core network 18 and a packet data network 50, such as the Internet. More specifically, the data connection in the UP is through an evolved NodeB, eNB, a UP node having a connectivity handling function (CHF-U) and an IP POP. There are two alternative paths through eNB, CHF-U and IP POP. A first path is through a first eNB1 22, a first CHF-U1 24 and a first IP POP1 12. A second path is through a second eNB2 32, a second CHF-U2 34 and a second IP POP2 14. The IP POPs form part of the core network 18. A control plane (CP) function unit 45 which is responsible for the CP management is also provided, which is shown as being part of the core network 18. The term eNB here is used as a generic term for a radio base station. It is also noted that the CHF-Us and IP POPs could be combined into a single entity.

During operation, when a UE 10 moves to a position from close to eNB1 22 to close to eNB2 32, e.g. changes cells, or when IP POP re-assignment is initiated by the core network, e.g. for radio access network load balancing reasons, the original PDU (packet data unit) session using the first communication path 2, which is anchored to CHF-U1 24 of eNB1 22, is released and a new PDU session is established using a second communication path 3, which is anchored to CHF-U2 34 of the now closer eNB2 32. The IP POP is thus changed from IP address IP@L1 to IP@L2. This type of handover is of the general type referred to as a 'break-before-make' handover, since the original session is terminated before the new session is commenced. As a result, service discontinuity in the time interval between tearing down the original session and setting up the new session may occur.

FIG. 2 shows another possible solution, in which the minimization of interruption time and packet loss is achieved by temporarily maintaining in parallel two IP sessions for access to the same Internet application server 16 via the PDN 50. The structural and functional components are the same as for FIG. 1, so they are not described again. The difference lies in how the communication paths change on movement of the UE 10 from close to eNB1 22 to close to eNB2 32.

As in FIG. 1, in FIG. 2 the original PDU session using the first communication path 2 is shown with a line labelled IP@L1. In this original PDU session, the UE 10 is anchored to CHF-U1 24 of eNB1 22. However, after movement of the UE 10 to close to eNB2 32, the UE's original session to CHF-U1 24 is maintained via eNB2 32 as represented by the line 6 connecting eNB2 32 and CHF-U1 24. This original session is maintained for a period while a new session is established to the now closer anchor CHF-U2 34. During this transition period, two IP sessions co-exist which are anchored at two different CHFUs, i.e. local anchors, using two different IP addresses. After the new session has been established, the original session is terminated.

We refer to the solution of FIG. 2 as CSIPTO (coordinated SIPTO). Such a solution was discussed in the context of 3GPP in Agenda Item 6.10.6 (S2-161802) by Intel entitled "Baseline solution for service continuity with anchor relocation" at the SA WG2 Meeting #114 which took place on 11-15 Apr. 2016 in Sophia Antipolis, France. This type of handover is of the general type referred to as a 'make-before-break' handover, since the original session is maintained while the second session is being established. While service discontinuity may thus be avoided, a certain UE behaviour (and support) in regard of the simultaneous handling of multiple IP addresses has to be assumed or defined.

Another solution is provided by IPv6 (IP version 6). In IPv6, a PDU session may be associated with multiple IPv6 prefixes (not just one as in IPv4). When a PDU session is associated with multiple IPv6 prefixes, the session is referred to as a multi-homed PDU session (see IPv6 Multi-homing without Network Address Translation, RFC7157, March 2014: https://tools.ietf.org/html/rfc7157). Multi-homed PDU sessions in IPv6 are discussed in Agenda Item 6.10.4 (S2-161825) by Intel entitled "Solution for session management model" at the SA WG2 Meeting #114 which took place on 11-15 Apr. 2016 in Sophia Antipolis, France. In this case, the PDU session provides access to the data network via two or more local anchors. The multi-homed PDU session may be used to support make-before-break service continuity, where the radio resources of the new and old communication paths are common.

Although IPv6 offers a powerful solution which avoids service discontinuity, not all user equipment will support IPv6. Moreover, even within user equipments that support IPv6, it may be that there are specific different implementations of the IPv6 stack, which require different commands and methods for selecting an IP address.

SUMMARY

There is a need for a technique for IP POP change that avoids one or more of the disadvantages of existing approaches discussed above, or other disadvantages.

According to one aspect of the disclosure, there is provided a method for Internet Protocol—IP—Point of Presence—POP—change for a user equipment in a communication architecture having a user plane for packet data communication of user data and a control plane for controlling the packet data communication, the method comprising:
(a) managing a first communication path in the user plane between a user equipment and a first IP POP having a first IP address, the first communication path having a first uplink path and a first downlink path;
(b) deciding in the control plane on an IP POP change to a second communication path in the user plane between the user equipment and a second IP POP having a second IP address, the second communication path having a second uplink path and a second downlink path; and
(c) performing in the control plane the IP POP change from the first communication path to the second communication path, wherein the IP POP change is effected by:
  i. preparing the second communication path;
  ii. switching from the first uplink path to the second uplink path;
  iii. assigning the second IP address to the user equipment;
  iv. activating the second downlink path; and
  v. releasing the first downlink path.

With this solution, which can take place in a single PDU session, there is in certain variants no need for the UE to use two IP addresses in parallel. The new communication path can be prepared in the core network before the new IP address is sent to the UE.

Making such an IP POP change within a single PDU session may also be efficient on radio resources, since the first (i.e. existing or old) communication path and the second (i.e. new) communication path can share a common radio access network (i.e. bearer) during the changeover of IP POP.

The starting point can be that the UE has an old IP address and is using an old communication path for uplink packets. The UE may then receive a new IP address and may use a new communication path for uplink packets with the new IP address. That is, the second downlink path may be activated following receipt by the user equipment of the second IP address.

For a temporary period after switching from the first uplink path to the second uplink path during which time the user equipment may be transmitting data packets bearing the first IP address, various measures can be taken to avoid loss of packets. One measure is to provide a filtering entity in the user plane which is configured by a control plane command to re-route such uplink data packets to the first IP POP. The filtering entity can be configured by the control plane command in various ways, for example (a) to re-route uplink data packets to the first IP POP based on the uplink data packets carrying the first IP address, (b) to re-route uplink data packets to the first IP POP based on the uplink data packets carrying a source IP address of the user equipment, or (c) re-route uplink data packets to the first IP POP based on the uplink data packets having at least one header field with a specified contents. The header field can be the source IP address, destination IP address, source transport port, or destination transport port, for example. These measures address a consequence of the IP POP change, which is that, during the transition, some of the old packets with the old IP address could also take the new communication path. To deal with this, a filtering rule can be applied to the network for a limited period in order to ensure that any old packets sent from the UE on the new path, but with the old IP address, are re-routed onto the old path. In some implementations, this re-routing can be effected by source-IP-address-based filtering for uplink packets, without having regard to the destination address, where the source IP address is the IP address of the UE.

In a further enhancement, during the change of local anchor, the uplink packets sent by the user equipment, which still have the old IP address, may be given special treatment by the network in order not to be lost. Namely, a verification entity can be provided in the user plane of the core network, which gates the data packets, and is configured by a control plane command to allow such uplink data packets to pass.

During the transfer, premature use of the second downlink path can be inhibited by putting in place firewall settings in the data communication path which prevent the passage of any data packets with the second IP address until these have been positively enabled. A command to initiate packet data communication on the second downlink path using the second IP address can then involve removing these firewall settings, or adjusting them to permit said passage. That is to say, the removal or adjustment of the firewall settings is part of the step of switching from the first downlink path to the second downlink path. Namely, premature use of the second downlink path is inhibited by firewall settings in the verification entity which are removed as part of the step of switching from the first downlink path to the second downlink path.

In some embodiments, the first communication path and the second communication path share a common radio bearer.

According to another aspect of the disclosure, there is provided a method of operating a user equipment to change its Internet Protocol (IP) Point of Presence (POP) in a communication architecture having a user plane for packet data communication of user data and a control plane for controlling the packet data communication, the method comprising:
(a) managing a first communication path in the user plane between a user equipment and a first IP POP having a first IP address, the first communication path having a first uplink path and a first downlink path;
(b) providing for the user equipment a second communication path in the user plane between the user equipment and a second IP POP having a second IP address, the second communication path having a second uplink path and a second downlink path; and
(c) implementing the IP POP change from the first communication path to the second communication path, wherein the IP POP change involves the user equipment receiving the second IP address and then transmitting on the second uplink path.

According to a further aspect, a computer program product bearing machine readable instructions executable to implement the method or method aspects presented herein is provided. The computer program product may be stored on a computer-readable recording medium, such as a CD-ROM, DVD-ROM or semiconductor memory. The computer program product may also be provided in the form of a data signal and/or for download via a network connection.

According to another aspect of the disclosure, there is provided a network component for managing Internet Protocol (IP) Point of Presence (POP) change for a user equipment in a communication architecture having a user plane for packet data communication of user data and a control plane for controlling the packet data communication, the core network component comprising a control plane function unit operable to:

(a) manage a first communication path in the user plane between a user equipment and a first IP POP having a first IP address, the first communication path having a first uplink path and a first downlink path;
(b) decide in the control plane on an IP POP change to a second communication path in the user plane between the user equipment and a second IP POP having a second IP address, the second communication path having a second uplink path and a second downlink path; and
(c) perform in the control plane the IP POP change from the first communication path to the second communication path, wherein the IP POP change is effected by:
  i. preparing the second communication path;
  ii. switching from the first uplink path to the second uplink path;
  iii. assigning the second IP address to the user equipment;
  iv. activating the second downlink path; and
  v. releasing the first downlink path.

According to yet another aspect of the disclosure, there is provided a user equipment capable of changing its Internet Protocol (IP) Point of Presence (POP) in a communication architecture having a user plane for packet data communication of is user data and a control plane for controlling the packet data communication, the user equipment being operable to:
(a) use a first communication path in the user plane between a user equipment and a first IP POP having a first IP address, the first communication path having a first uplink path and a first downlink path;
(b) access a second communication path in the user plane between the user equipment and a second IP POP having a second IP address, the second communication path having a second uplink path and a second downlink path; and
(c) implement the IP POP change from the first communication path to the second communication path, wherein the IP POP change involves the user equipment receiving the second IP address and then transmitting on the second uplink path.

BRIEF DESCRIPTION OF THE DRAWINGS

The embodiments of the technique presented herein are described herein below with reference to the accompanying drawings.

DETAILED DESCRIPTION

Figure 1:
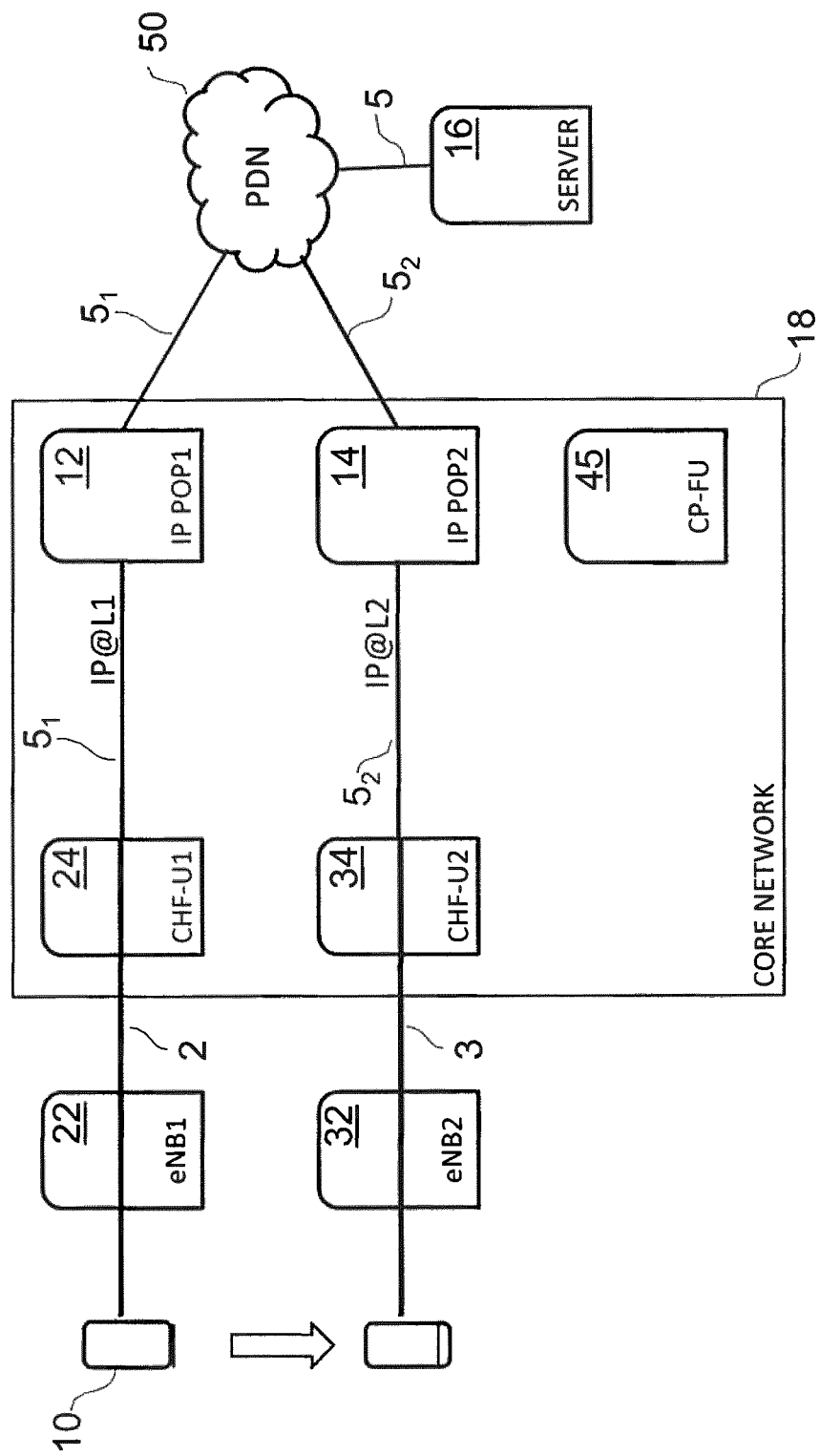
FIG. 1 is a schematic diagram of a system undergoing a prior art method for changing local anchor through SIPTO.

In the following description, for purposes of explanation and not limitation, specific details are set forth (such as particular method steps) in order to provide a thorough understanding of the technique presented herein. It will be apparent to one skilled in the art that the present technique may be practiced in other embodiments that depart from these specific details. For example, while the following embodiments will be described with reference to 5G and also 4G networks, it will be appreciated that the technique presented herein is not limited to any type of cellular network access.

Those skilled in the art will further appreciate that the services, functions and steps explained herein may be implemented using software functioning in conjunction with a programmed microprocessor, or using an Application Specific Integrated Circuit (ASIC), a Digital Signal Processor (DSP), a field programmable gate array (FPGA) or general purpose computer. It will also be appreciated that while the following embodiments are described in the context of methods and systems, the technique presented herein may also be embodied in a computer program product as well as in a system comprising a computer processor and a memory coupled to the processor, wherein the memory is encoded with one or more programs that execute the services, functions and steps disclosed herein.

Certain terms used in the following detailed description of exemplary embodiments are defined as follows:

Uplink: a transmission path in a direction from a UE to a PDN over a part or the whole of a data link from UE to PDN.

Downlink: a transmission path in a direction from a PDN to a UE over a part or the whole of a data link from UE to PDN. A transmission path may be bi-directional, i.e. comprise an uplink and a downlink.

PDU Connectivity Service: a service that provides exchange of PDUs between a UE and a data network.

PDU Session: an association between the UE and a data network that provides a PDU Connectivity Service.

PDU Session of IP Type: an association between the UE and an IP data network. A PDU session may exist, for example, between a UE and a UP function, such as a terminating UP function (TUPF).

4G: is the fourth generation of mobile telecommunications technology as defined by the ITU in IMT Advanced, such as LTE.

5G: is the fifth generation of mobile telecommunications and wireless technology which is still in a study phase, e.g. in 3GPP TR 23.799 version 0.4.0 (Release 14) of April 2016.

The sequence diagram and the following supporting description use a number of acronyms, the meaning of which is as follows:

| Acronym | Description |
| --- | --- |
| 3GPP | Third Generation Partnership Project |
| AAA | Authentication Authorization and Accounting |
| BSID | Base Station Identifier |
| CHF-U | Connectivity Handling Function on UP/UP Node |
| CP | Control Plane |
| CSIPTO | Coordinated SIPTO |
| DL | Downlink |
| DN | Data Network |
| eNB | evolved Node-B (base station) |

-continued

| Acronym | Description |
|---|---|
| EPC | Evolved Packet Core |
| HO | Handover |
| HSS | Home Subscriber Server |
| IP | Internet Protocol |
| LN | Local Home Network ID (LNID) |
| LTE | Long-term evolution |
| MME | Mobility Management Entity |
| PGW | PDN Gateway |
| POP | Point of Presence |
| PDN | Packet Data Network |
| PDU | Packet Data Unit |
| PCRF | Policy and Charging Rules Function |
| QUIC | Quick UDP Connections |
| RAN | Radio Access Network |
| RAT | Radio Access Technology |
| SGW | Serving Gateway |
| SIP | Session Initiation Protocol |
| SIPTO | Selected IP Traffic Offload |
| SSC | Session and Service Continuity |
| TCP | Transmission Control Protocol |
| TEID | Tunnel Endpoint Identifier |
| TP | Transport Protocol |
| TUPF | Terminating UP function |
| UE | User Equipment |
| UL | Uplink |
| UP | User Plane |
| X2 | an inter-eNB interface responsible for managing HO |

Figure 3:
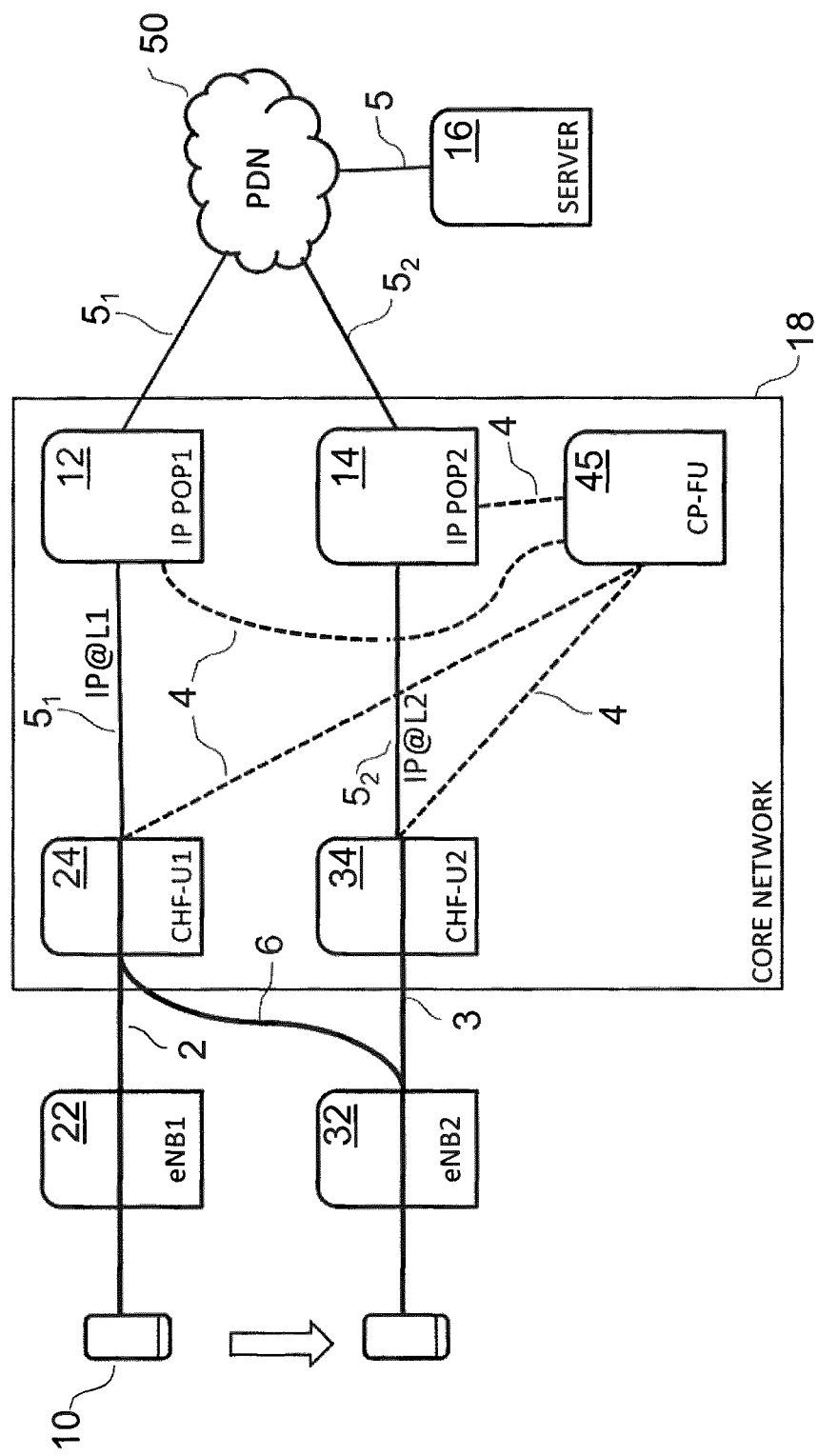
FIG. 3 is a schematic diagram of a system undergoing a method for changing local anchor according to an embodiment of the present disclosure, implemented in a 5G network.

FIG. 3 is a schematic diagram of a system undergoing a method for changing local anchor according to an embodiment of the present disclosure. A user equipment (UE) 10 is shown moving from an initial position to a new position, wherein the movement is indicated by the arrow. The core network comprises a user plane (UP) and a control plane (CP).

The CP provides protocols for control and support of one or more user plane functions, specifically: controlling the network access connections to E-UTRAN (evolved UMTS Terrestrial Radio Access Network) or any other radio access network (RAN), such as attaching to and detaching from E-UTRAN; controlling the attributes of an established network access connection, such as activation of an IP address; controlling the routing path of an established network connection in order to support user mobility; and controlling the assignment of network resources to meet changing user demands. The CP function is responsible for CP management and includes handling mobility pertaining to network access. In the exemplary scenario shown in FIG. 3, the CP function is hosted in a CP function unit CP-FU 45. The CP-FU 45 is shown as being part of the core network 18, but could be situated outside the core network 18.

A packet data connection for the UE 10 to an Internet application server 16 through the core network 18 and a packet data network (PDN) 50, such as the internet, is provided. More specifically, the data connection in the UP is through an evolved NodeB, eNB, a UP node having a connectivity handling function (CHF-U) and an IP POP. There are two alternative paths through eNB, CHF-U and IP POP. A first path is through a first eNB1 22, a first CHF-U1 24 and a first IP POP1 12. A second path is through a second eNB2 32, a second CHF-U2 34 and a second IP POP2 14. The IP POPs form part of the core network 18. A control plane (CP) function unit 45 which is responsible for the CP management is also provided, which is shown as being part of the core network 18. The term eNB here is used as a generic term for a radio base station. It is also noted that the CHF-Us and IP POPs could be combined into a single entity. The network may host various further functional units, such as an HSS function unit, an AAA access unit and a PCRF function unit not illustrated in FIG. 3.

During operation, when a UE 10 moves to a position from close to eNB1 22 to close to eNB2 32, e.g. changes cells, or when IP POP re-assignment is initiated by the core network, e.g. for RAN load balancing reasons, the original PDU (packet data unit) session using the first communication path 2, which is anchored to CHF-U1 24 of eNB1 22, is maintained and a new IP address, IP@L2 is assigned to the UE 10. The session then uses a second communication path 3, which is anchored to CHF-U2 34 of the now closer eNB2 32.

In its initial position, the UE 10 is anchored to CHF-U1 and thus IP POP1. This is because eNB1 22 is located local to the UE 10 at this time. The UE 10 thus establishes a first communication path 2 to the PDN 50 and Internet application server 16 in the UP using the IP address IP@L1. The communication is generally bi-directional, i.e. the first communication path 2 has a first uplink path and a first downlink path.

After moving to its new position, the UE 10 is still anchored to CHF-U1 and thus IP POP1. However, it is now closer to a different eNB, namely eNB2 32, so it would be sensible to move its anchor to CHF-U2 and thus IP POP2. In general a decision to move anchor would be made by the CP function, e.g. in CP-FU 45, which may obtain relevant information from a variety of sources. For example, the core network may have a configuration which has knowledge of which set of eNBs are to be considered local for a given UP entity, and the core network can detect when the UE moves out of one eNB locality to another eNB locality. The CP in the core network may for example obtain coarser UE location information based on a tracking area update procedure, and finer UE location information from knowledge of the current eNB.

Once a relevant network entity has detected the second IP POP which is capable of being anchored to by the UE 10, a transfer of the anchor can be initiated through action by the CP-FU 45. The second IP POP2 is namely capable of establishing a second communication path 3 for the UE 10 to the Internet application server 16 via the core network 18 and PDN 50 in the UP using a second IP address IP@L2. The second communication path 3 has a second uplink path and a second downlink path.

The process of transferring the anchor is now described, i.e. the transfer of the UE's 10 packet data connection from the first communication path 2 to the second communication path 3. In high level terms, the transfer involves a first phase in which the uplink path is switched to the new one while the old downlink path is continued with, and a second phase in which the new downlink path is initially set up and only then activated once prepared. The activation of the new downlink path can take place by sending the second IP address to the UE 10, wherein, upon receipt thereof, the UE 10 will start using the second IP address to receive packets sent to it on the downlink and also to send packets on the uplink. The second phase can be further broken down into the sub-steps of: enabling the second downlink path for the UE; notifying the UE 10 of the second IP address; and activating the second downlink path for the UE. The second downlink path is enabled by a user plane entity advertising the second IP address, and putting an incoming downlink data packet into a tunnel, so that it is forwarded along the downlink path to the eNB2. Finally, once the anchor change has been completed, the first downlink path in the UP can be torn down, i.e. terminated.

Referring to FIG. 3, the lines 2, 3, 5, 6 between UE 10, eNB1 22, CHF-U1 24, eNB2 32, IP POP-1 12, IP POP-2 14, PDN 50 and Internet application server 16 show the various uplink and downlink paths in the UP during anchor change. Selected ones of the CP command connections 4 to the various components from the CP-FU 45 are shown with dashed lines.

At its initial position, as already stated above, the UE 10 is communicating with the Internet application server 16 using the first communication path 2 and using the IP address IP@L1. After movement close to eNB2 32, the UE's 10 connection to CHF-U1 24 using IP@L1 is initially maintained, but now via eNB2 32 instead of eNB1 22, as represented by the line 6 connecting eNB2 32 and CHF-U1 24. (It is noted that this branching of the communication paths need not originate from the eNB, but could be done in a dedicated UP node that acts as a branching entity for the PDU session which is located functionally between the eNB and CHF-U.) As soon as possible once it is logged that the packet data connection is flowing through eNB2 32 to CHF-U1 24, the following steps are performed. The new communication path is prepared, namely the uplink and downlink parts of the new communication path. The uplink is switched to the new communication path. The new IP address, IP@L2, is assigned to UE 10. (The new, i.e. second, IP address IP@L2 can be sent to the UE through the control plane, or through a packet sent along a tunnel in the existing downlink path 4.) The new downlink path is activated. Finally, the old path is released.

Here it is noted that the co-existence of the uplink and downlink on different paths is possible in a single session, because the radio bearer is common or shared between them. Upon receipt of IP@L2, the UE 10 then starts using this new IP address, thereby completing the switching of both uplink and downlink parts of the communication path. That is to say, in the UP, sub-paths 3 (eNB2 32 to CHF-U2 34) and $5_2$ (CHF-U2 34 to IP POP2 14) now represent the path for both the uplink and the downlink between the UE 10 and the Internet application server 16. As already stated above, the first downlink path comprising the sub-paths 2 (eNB1 22 to CHF-U1 24) and $5_1$ (CHF-U1 24 to IP POP1 12) can now be terminated, thereby severing the last part of the original communication path 2.

Figure 4:
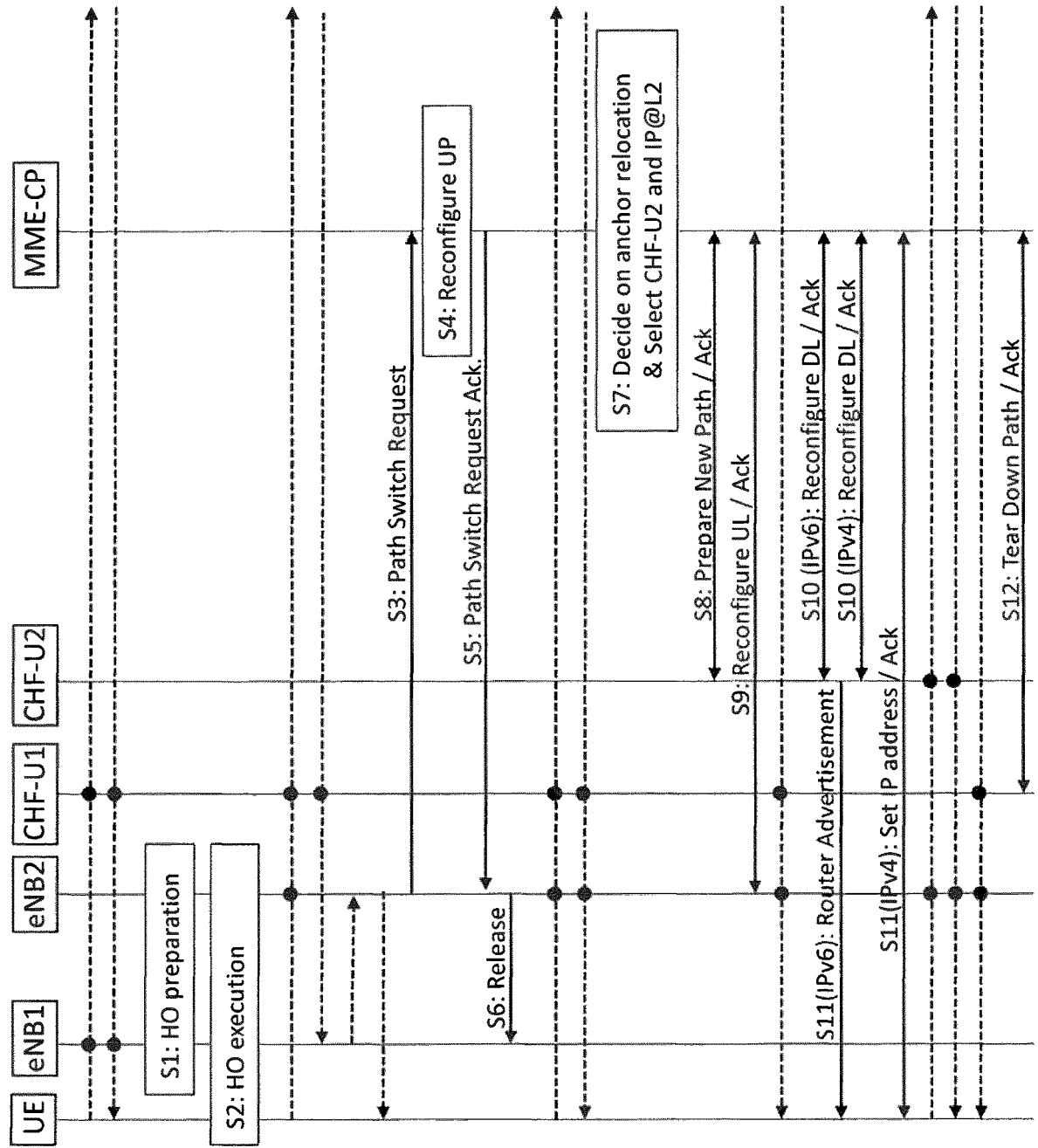
FIG. 4 is a message sequence diagram illustrating in detail the method for changing local anchor shown in FIG. 3.

FIG. 4 is a message sequence diagram illustrating in more detail the method for changing local anchor shown in FIG. 3. In FIG. 4, dashed arrows show the UP path for the traffic, i.e. packet data communication, in the different directions (uplink UL and downlink DL). Dots on the dashed lines represents the nodes through which the traffic passes.

The handover and the change of local anchor can be broken down into three activities: handover preparation, handover execution and handover completion. The handover preparation and handover execution steps as well as the initial steps of handover completion can follow the standard procedure described in Section 5.5.1.1.2 of 3GPP TS 23.401 version 13.6.1 Release 13 of May 2016 and references therein, the contents of which section are incorporated herein by reference. Alternative sequences could also be considered in other 5G implementations. Since the handover preparation and handover execution steps are the same as in the above-referenced section of the standards document, these are not described here. The handover procedure described with reference to FIG. 4, like that in the above-referenced section of the standards document, uses an X2 interface, which is an inter-eNB interface specified in 3GPP which is responsible for managing handovers, specifically for ensuring buffer and context transfer, between source and target eNBs when a UE moves from the source to the target eNB, i.e. when a UE changes cells.

Before handover commences there is uplink and downlink traffic passing through node eNB1 22 and associated UP node CHF-U1 24.

In Step S1, handover preparation is performed.

In Step S2, handover execution is performed.

After Step S2, the uplink traffic from the UE 10 is now being received by eNB2 32 and is then re-routed from eNB2 32 to CHF-U1 24 via path 6. There is also a downlink path between eNB1 and eNB2 along which downlink packets are forwarded from eNB1 to eNB2 and then to the UE.

Further, after the handover from eNB1 to eNB2, there is a new radio bearer between the UE and eNB2 which carries both the uplink and downlink traffic.

In Step S3, eNB2 32 sends a Path Switch Request message to CP-FU 45 to inform the CP function that the UE 10 has changed cell, e.g. containing the base station entity ID (BSID) and local network ID (LN ID).

In Step S4, the UP between the base station and the other core network UP entities is reconfigured. Initially during Step 4, the DL traffic is being forwarded from eNB1 to eNB2, while the UP is being reconfigured. However, once the UP has been reconfigured, still during Step 4, the Internet application server 16 starts sending DL packets to the eNB2 32 and other new parameters.

In Step S5, the CP-FU 45 confirms the Path Switch Request message with the Path Switch Request Ack message.

In Step S6, by sending Release Resource the eNB2 32 informs success of the handover to eNB1 22 and triggers the release of resources. This step is specified in 3GPP TS 36.300 "Evolved Universal Terrestrial Radio Access (E-UTRA) and Evolved Universal Terrestrial Radio Access Network (E-UTRAN); Overall description; Stage 2".

In Step S7, the CP function decides on anchor relocation. This decision may be based on information received from eNB2 32 (e.g., an LN ID) or other information available in CP. The new UP node, CHF-U2 34, and other information (e.g., new IP address) are selected.

In Step S8, the new UP path is prepared by a Prepare Path message to the would-be UP node(s) CHF-U2 34 conveying the new IP address and other parameters such as a tunnel endpoint identifier (TEID) and the ID of the target base station, i.e. eNB2 32. At this point, the new DL path has been setup end-to-end, but does not yet carry traffic, since UE 10 is still using the old IP address. Undesired use of the DL path at this time may be further enforced, i.e. precluded, by firewall settings in CHF-U2 34.

In Step S9, the UL path is switched. This may be done via a CP command issued from the CP-FU 45 to the eNB2 32 (or to a distinct branching point entity not located in the eNB2 32).

In Steps S10 and S11 the DL path is also switched by removing the firewall rules, and the UE 10 is notified of the new IP addresses to use. There may be different methods to accomplish this, for example routing advertisements may be used in the IPv6 case. In the IPv4 case this may require a separate signaling to the UE 10 of the new IP address.

In Step S12, the old UL path is torn down by removing the remaining relevant settings with a suitable CP instruction.

In the above-described procedure, there is a time period after Step S9 until Step S11 where the UE 10 is configured with the new IP address during which UL packets with the old IP address will be routed to the new IP POP, IP POP2 via CHF-U2.

If nothing is done to handle these UL packets with the old IP address that are routed to CHF-U2 34, the result may be that, due to anti-IP spoofing functions, they are lost. This may cause performance degradation for some Transport Protocol (TP) implementations. However, some evolved TPs, such as QUIC (see QUIC: A UDP-Based Secure and Reliable Transport for HTTP/2, http://tools.ietf.org/html/draft-tsvwg-quic-protocol-00), may be able to handle these packets as 'non-congestion losses' and recover quickly. An explicit IP address change notification may even increase performance for well-designed TPs that can make use of this trigger to, for example, faster adapt to a new radio access.

On the other hand, active measures may be taken to ensure these packets are not lost.

One option is to implement a new CHF-U2 feature that temporarily allows UL packets with a specific (old) IP address to pass. The new path is thus configured to allow UL packets with a certain different IP address as a temporary exception to the anti-IP spoofing rule.

Another option is to apply a filtering rule during Step S9 that chooses the UL path according to the source IP address carried by the packet, i.e. the IP address of the UE 10, which is already known to the CP. The filtering rule could be hosted by a dedicated filtering entity or by applying a rule within an existing entity such as an eNB.

This may also be implemented as a temporary rule similar to as the previous one. The access node, i.e. the base station or branching entity, is thus configured with a mapping rule to direct UL packets to the old or new path depending on the source IP address.

These temporary rules could be invoked by a single CP command which causes the new rule to persist for a fixed period of time or a pair of CP commands for switching the rules on and off.

Figure 5:
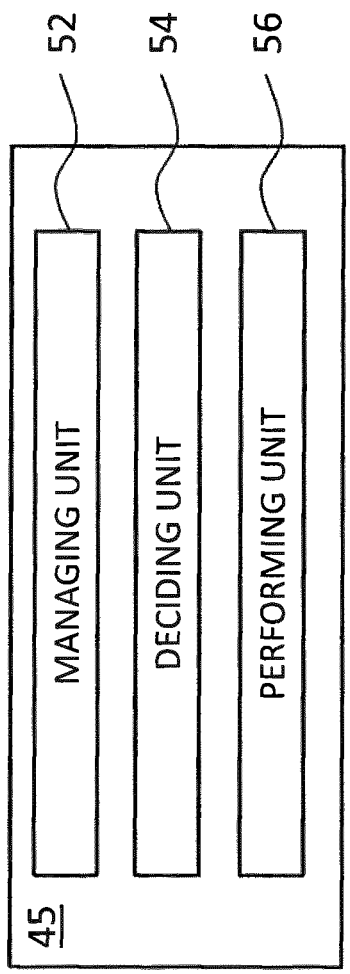
FIG. 5 is a block diagram showing a control plane function unit present in the system of FIG. 3.

FIG. 5 is a block diagram showing the CP-FU 45. Within a single PDU session, in which there is packet data communication between the UE and the Internet application server 16, the CP-FU 45 is operable to control anchor relocation of the UE 10 to a different IP POP. The PDU session takes place in a communication architecture having a user plane, for carrying out the PDU session, and a control plane, for controlling the PDU session. The CP-FU 45 has a managing unit 52 operable to manage the first communication path 2 in the user plane between the user equipment 10 and the application server 16 via the first IP POP1 12 having the first IP address. The first communication path has a first uplink path and a first downlink path. The CP function unit 45 also has a deciding unit 54 operable to decide in the control plane on an IP POP change to the second communication path 3 in the user plane between the user equipment 10 and the application server 16 via the second IP POP2 14 having the second IP address. The second communication path also has a second uplink path and a second downlink path. The CP-FU 45 has a performing unit 56 operable to perform in the control plane the anchor relocation, i.e. the CHF-U change, from the first communication path 2 to the second communication path 3.

The CP-FU 45 may further be configured to perform any of the steps discussed above with reference to FIGS. 3 and 4.

Figure 6:
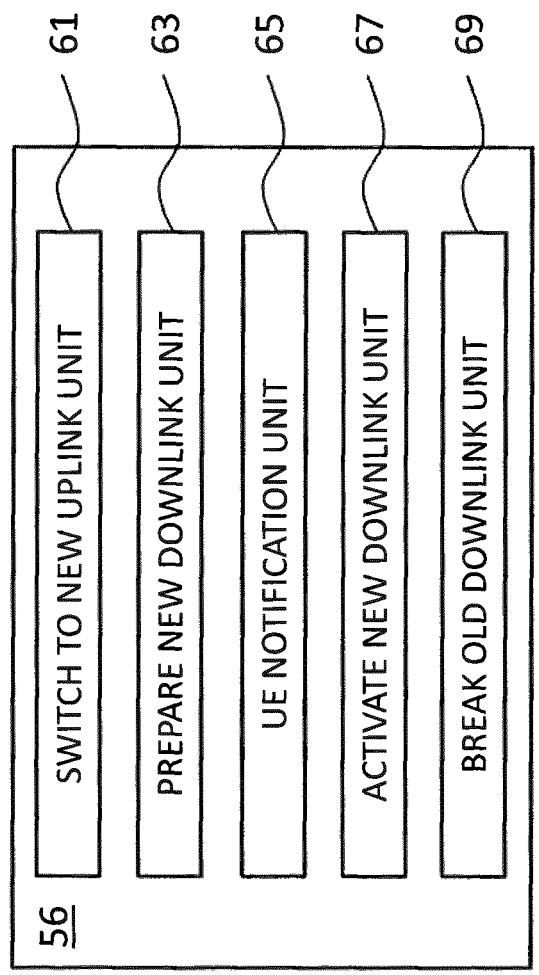
FIG. 6 is a block diagram showing sub-units of the control plane function unit of FIG. 5.

FIG. 6 is a block diagram showing computer program product sub-units of the performing unit 56 of FIG. 5. The performing unit 56 has a UE notification unit 65 operable to send the UE 10 the second IP address. The performing unit 56 has a switch-to-new-uplink unit 61 operable to switch from the first uplink path to the second uplink path. The performing unit 56 has a prepare-new-downlink unit 63 operable to prepare, i.e. enable, the second downlink path. The performing unit 56 has an activate-new-downlink unit 67 operable to activate the second downlink path. The performing unit 56 has a break-old-downlink unit 69 operable to break the first downlink path.

Figure 7:
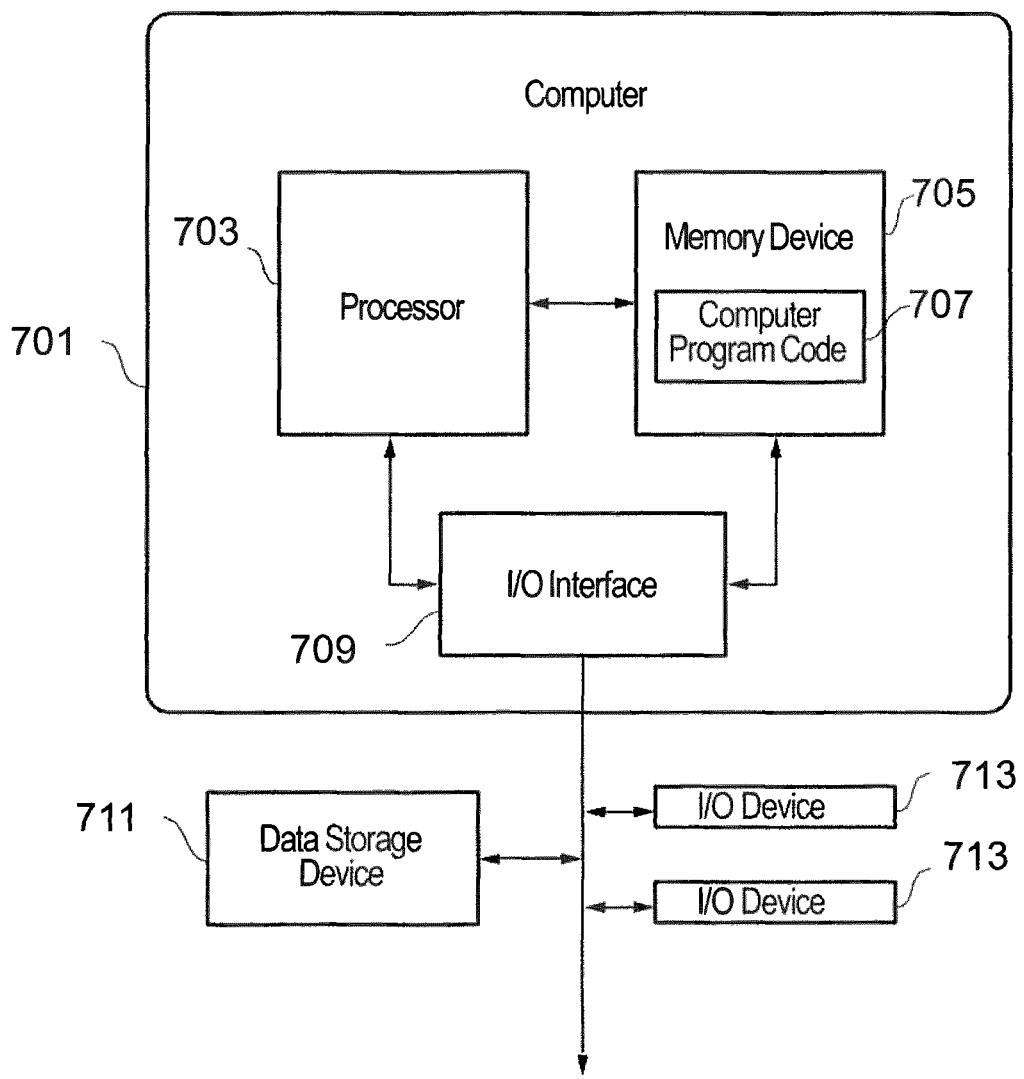
FIG. 7 shows a structure of a computer and computer program code that may be used to implement any of the disclosed methods and may be incorporated in any of the disclosed components.

FIG. 7 shows a structure of a computer and computer program code that may be used to implement any of the above-described methods and may be incorporated in any of the above-described components. Specifically, such a computer as shown may be incorporated in or configured to implement any of the following: eNBs, CHF-Us, connection entities, IP POPs, CP-FU, UEs, PDN and Internet application server.

In FIG. 7, computer system 701 comprises a processor 703 coupled through one or more I/O Interfaces 709 to one or more hardware data storage devices 711 and one or more I/O devices 713 and 715. Processor 703 may also be connected to one or more memory devices or memories 705. At least one memory device 705 contains stored computer program code 707, which is a computer program that comprises computer-executable instructions. The stored computer program code includes a program that implements the method and method aspects presented herein. The data storage devices 711 may store the computer program code 707. Computer program code 707 stored in the storage devices 711 is configured to be executed by processor 703 via the memory devices 705. Processor 703 executes the stored computer program code 707.

Memory 705 may comprise any known computer-readable storage medium, which is described below. In one implementation, cache memory elements of memory 705 provide temporary storage of at least some program code (e.g., program code 707) in order to reduce the number of times code needs to be retrieved from bulk storage while instructions of the program code are carried out. Moreover, similar to CPU 703, memory 705 may reside at a single physical location, comprising one or more types of data storage, or be distributed across a plurality of physical systems in various forms.

I/O interface 709 comprises any system for exchanging information to or from an external source. I/O devices 713, 715 comprise any known type of external device, including a display device (e.g., monitor), keyboard, etc. A bus provides a communication link between each of the components in computer system 701, and may comprise any type of transmission link, including electrical, optical, wireless, etc.

I/O interface 709 also allows computer system 701 to store information (e.g., data or program instructions such as program code 707) on and retrieve the information from computer data storage unit 711 or another computer data storage unit (not shown). Computer data storage unit 711 may comprise any known computer-readable storage medium. For example, computer data storage unit 711 may be a non-volatile data storage device, such as a semiconductor memory, a magnetic disk drive (i.e., hard disk drive) or an optical disc drive (e.g., a CD-ROM drive which receives a CD-ROM disk).

An implementation of the present disclosure may take the form of a computer program product embodied in one or more computer-readable storage medium(s) (e.g., memory 705 and/or computer data storage unit 711) having computer-readable program code (e.g., program code 707) embodied or stored thereon.

Program code (e.g., program code 707) embodied on a computer-readable medium may be transmitted using any appropriate medium, including but not limited to wireless, wireline, optical fiber cable, radio frequency (RF), etc., or any suitable combination of the foregoing.

Figure 8:
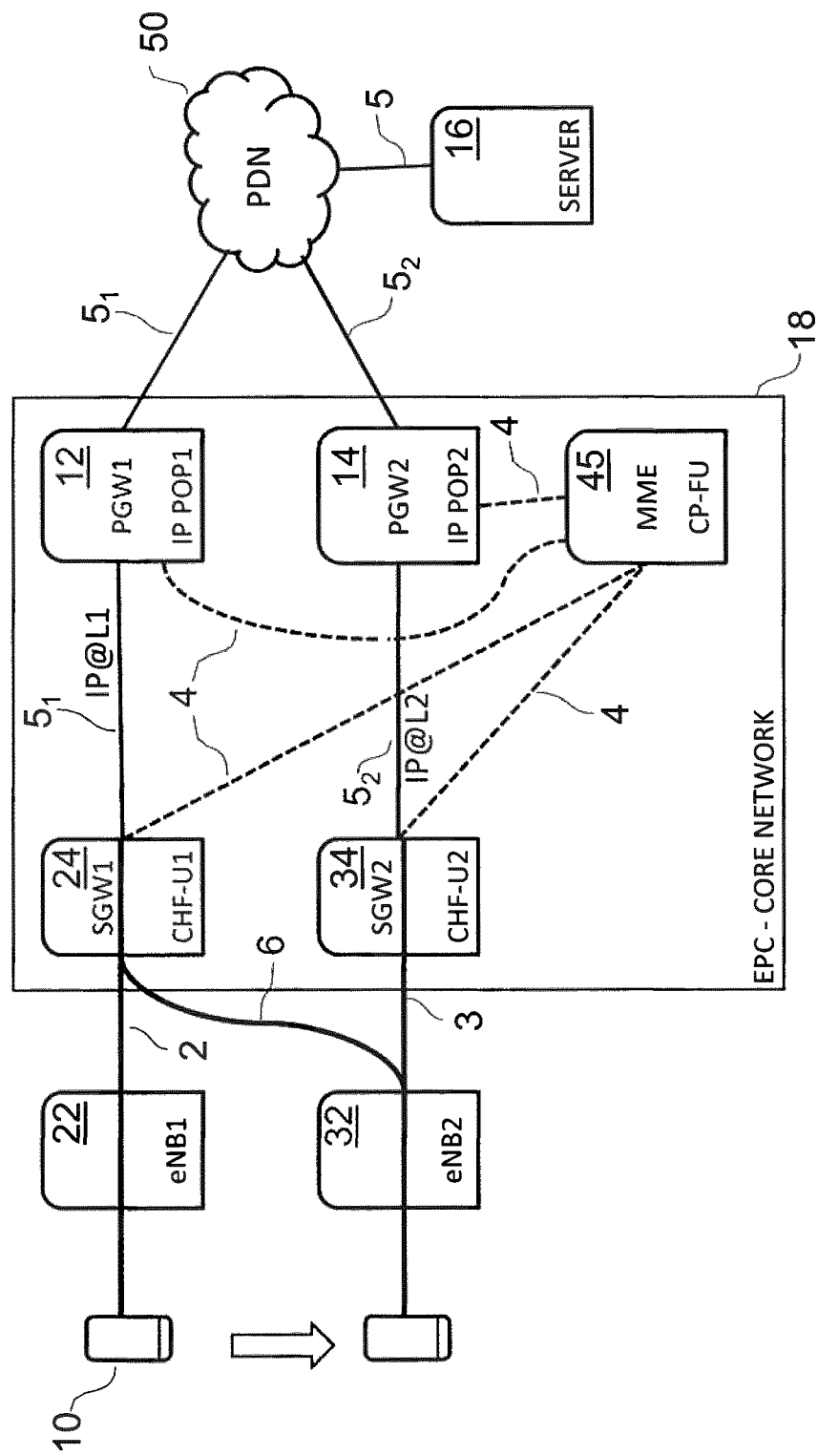
FIG. 8 is a schematic diagram of a system undergoing a method for changing local anchor according to an alternative embodiment, implemented in a 4G network.

FIG. 8 is a schematic diagram of a system undergoing a method for changing local anchor according to an alternative embodiment of the present disclosure based on 4G architecture using an evolved packet core.

As in the previous embodiment, UE 10 is shown moving from an initial position to a new position, wherein the movement is indicated by the arrow. The UE 10 is moving in space covered by a radio protocol architecture comprising a UP and a CP.

The CP provides protocols for control and support of one or more user plane functions, specifically: controlling the network access connections to E-UTRAN (evolved UMTS Terrestrial Radio Access Network) or any other radio access network (RAN), such as attaching to and detaching from E-UTRAN; controlling the attributes of an established network access connection, such as activation of an IP address; controlling the routing path of an established network connection in order to support user mobility; and controlling the assignment of network resources to meet changing user demands. The CP function includes handling mobility pertaining to, for example, LTE network access. In the exemplary scenario shown in FIG. 8, the CP function is hosted in a CP function unit which is functionally part of an MME.

A packet data connection for the UE 10 to an Internet application server 16 through the core network 18, in the form of an evolved packet core (EPC), and a packet data network (PDN) 50, such as the internet, is provided. More specifically, the data connection in the UP is through a base station having an evolved NodeB, eNB, a serving gateway (SGW) forming a UP node having a connectivity handling function is (CHF-U) and a packet gateway (PGW) hosting the IP POP. There are two alternative paths through eNB, CHF-U and IP POP. A first path is through a first eNB1 22, a first CHF-U1 24 and a first IP POP1 12. A second path is through a second eNB2 32, a second CHF-U2 34 and a second IP POP2 14. The IP POPs form part of the core network 18. A control plane (CP) function unit 45 which is responsible for the CP management is also provided, which is shown as being part of the core network 18. The term eNB here is used as a generic term for a radio base station. The EPC 40 may host various further functional units, such as an HSS function unit, an AAA access unit and a PCRF function unit not illustrated in FIG. 8.

During operation, when a UE 10 moves to a position from close to eNB1 22 to close to eNB2 32, e.g. changes cells, or when IP POP re-assignment is initiated by the core network, e.g. for RAN load balancing reasons, the original PDU (packet data unit) session using the first communication path 2, which is anchored to CHF-U1 24 of eNB1 22, is maintained and a new IP address, IP@L2 is assigned to the UE 10. The session then uses a second communication path 3, which is anchored to CHF-U2 34 of the now closer eNB2 32.

In its initial position, the UE 10 is anchored to CHF-U1 and thus IP POP1. This is because eNB1 22 is located local to the UE 10 at this time. The UE 10 thus establishes a first communication path 2 to the PDN 50 and Internet application server 16 in the UP using the IP address IP@L1. The communication is generally bi-directional, i.e. the first communication path 2 has a first uplink path and a first downlink path.

After moving to its new position, the UE 10 is still anchored to CHF-U1 and thus IP POP1. However, it is now closer to a different eNB, namely eNB2 32, so it would be sensible to move its anchor to CHF-U2 and thus IP POP2. In general a decision to move anchor would be made by the CP function, e.g. in CP-FU 45, which may obtain relevant information from a variety of sources. For example, the core network may have a configuration which has knowledge of which set of eNBs are to be considered local for a given UP entity, and the core network can detect when the UE moves out of one eNB locality to another eNB locality. The CP in the core network may for example obtain coarser UE location information based on a tracking area update procedure, and finer UE location information from knowledge of the current eNB.

Once a relevant network entity has detected the second IP POP which is capable of being anchored to by the UE 10, a transfer of the anchor can be initiated through action by the CP-FU 45. The second IP POP2 is namely capable of establishing a second communication path 3 for the UE 10 to the Internet application server 16 via the core network 18 and PDN 50 in the UP using a second IP address IP@L2. The second communication path 3 has a second uplink path and a second downlink path.

The process of transferring the anchor is now described, i.e. the transfer of the UE's 10 packet data connection from the first communication path 2 to the second communication path 3. In high level terms, the transfer involves a first phase in which the uplink path is switched to the new one while the old downlink path is continued with, and a second phase in which the new downlink path is initially set up and only then activated once prepared. The activation of the new downlink path can take place by sending the second IP address to the UE 10, wherein, upon receipt thereof, the UE 10 will start using the second IP address to receive packets sent to it on the downlink and also to send packets on the uplink. The second phase can be further broken down into the sub-steps of: enabling the second downlink path for the UE; notifying the UE 10 of the second IP address; and activating the second downlink path for the UE. The second downlink path is enabled by a user plane entity advertising the second IP address, and putting an incoming downlink data packet into a tunnel, so that it is forwarded along the downlink path to the eNB2. Finally, once the anchor change has been completed, the first downlink path in the UP can be torn down, i.e. terminated.

Referring to FIG. 8, the lines 2, 3, 5, 6 between UE 10, eNB1 22, CHF-U1 24, eNB2 32, IP POP-1 12, IP POP-2 14, PDN 50 and Internet application server 16 show the various uplink and downlink paths in the UP during anchor change. Selected ones of the CP command connections 4 to the various components from the CP-FU 45 are shown with dashed lines.

At its initial position, as already stated above, the UE 10 is communicating with the EPC 40 using the first communication path 2 and using the IP address IP@L1. After movement close to eNB2 32, the UE's 10 connection to CHF-U1 24 using IP@L1 is initially maintained, but now via eNB2 32 instead of eNB1 22, as represented by the line 6 connecting eNB2 32 and CHF-U1 24. As soon as possible once it is logged that the packet data connection is flowing through eNB2 32 to CHF-U1 24, the uplink part of the UE's 10 connection is switched to flow from eNB2 32 to CHF-U2 34, i.e. using the IP address IP@L2 of the second base station 30, as indicated by the portion of the dotted line 3 connecting eNB2 32 and CHF-U2 34. The change of the downlink path is now prepared and, once ready, the second IP address IP@L2 is sent to the UE, for example through the control plane, or through a packet sent along the existing downlink path 4 via CHF-U1 24. Here it is noted that the co-existence of the uplink and downlink on different paths is possible in a single session, because the radio bearer is common or shared between them. Upon receipt of IP@L2, the UE 10 then switches to the downlink path via CHF-U2 34 and eNB2 32 completing the switching of both uplink and downlink parts of the communication path to the second base station 30 (i.e., in the UP, paths 3 and 5$_2$ now represents the path for both the uplink and the downlink between the UE 10 and the SGW 42). As already stated above, the first downlink path 2, 5$_1$ can now be terminated, thereby severing the last part of the original communication path 2 to the first base station 20.

It will be understood that this 4G embodiment can use the same message sequence as illustrated in FIG. 4 for the 5G embodiment for an IP POP change. This 4G embodiment also has the same structure of control plane function unit and sub-unit as shown in FIGS. 5 and 6 for the 5G embodiment. Moreover, the same structure of a computer and computer program code as shown in FIG. 7 for the 5G embodiment is also applicable to the 4G embodiment. Specifically, in this 4G embodiment, such a computer as shown may be incorporated in or configured to implement any of the following: eNBs, CHF-Us, UEs, EPC, MME, SGW, PGW, PDN and Internet application server.

A further alternative embodiment is now described in which a 5G system supports several PDU session and service continuity (SSC) modes. One of these SSC modes is referred to as SSC mode 2 in which the same TUPF is only maintained across a subset (i.e. one or more, but not all) of the access network attachment points (e.g. cells and RATs), referred to as the serving area of the TUPF. When the UE leaves the serving area of a TUPF, the UE will be served by a different TUPF suitable for the UE's new point of attachment to the network. It is noted that the serving area of a TUPF may also be limited to a single cell only, e.g. in case of stationary UEs.

This embodiment proposes an enhancement of the PDU session and service continuity framework suitable for SSC mode 2. In this embodiment, a single PDU session is kept with two addresses (i.e. it is a multi-homing session). In other words, the existing session is re-used by the UE and RAN. The multi-homing approach of having multiple addresses/prefixes per PDU session is included only for IPv6.

However, the very same principle could also be used for IPv4 as well. Just as it is possible to map two IPv6 prefixes to a single PDU session, it is also possible to map two IPc4 addresses to a single PDU session. In both cases, a network branching function can be used to filter the traffic towards the appropriate TUPF. Such a filtering is possible based on the source address for uplink traffic whose complexity is not significantly different for IPv4 or for IPv6.

The concept of branching sessions where a new TUPF is set up for the session before the old TUPF is released can be applied to SSC mode 2. The new TUPF can be set up in advance, but not impact the UE and the RAN initially. The PDU session will have a branching point where the path towards the old TUPF and the new TUPF fork out. Once new path of the PDU session is established, the UE is notified about the new address/prefix. In SSC mode 2, the old address/prefix is immediately released as soon as the new one is configured into the UE. Nevertheless, on the network side similar procedures can apply. For SSC mode 2, the system efficiency can be improved as there is only a single session used at the UE and RAN. For SSC mode 2, this approach can be executed faster and we can minimize the time while the UE is without an IP address. The core network can prepare a new PDU Session "leg" and in the end simply notify the UE of the existence of a new IP address/prefix.

Figure 9:
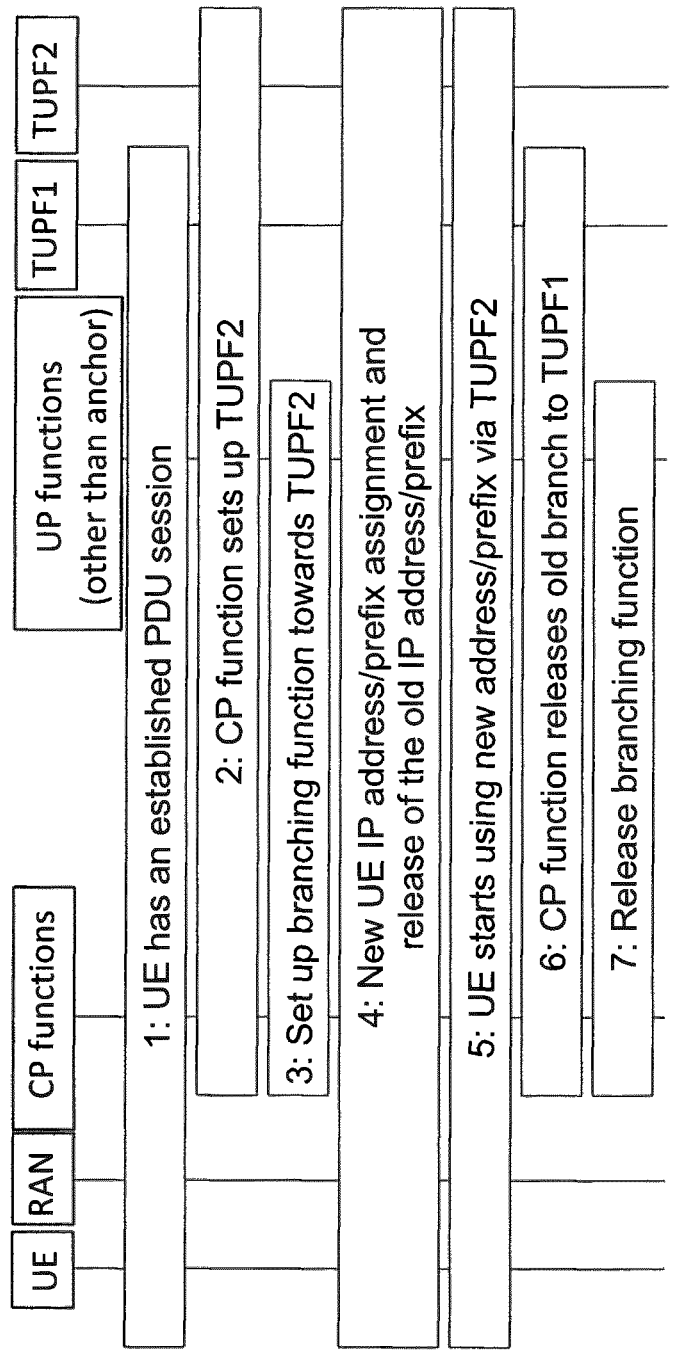
FIG. 9 is a sequence diagram for a further alternative embodiment.

FIG. 9 shows this method in more detail with a sequence diagram. The sequence of steps carried out in this embodiment as illustrated in FIG. 9 is as follows.

1. UE has an established PDU Session with TUPF1. The PDU Session user plane involves the RAN, TUPF1 and possibly some intermediate user plane functions (other than IP anchors).

2. At some point the CP function decides to establish a new branch of PDU Session 1 because the existing branch has become suboptimal, for example due to UE mobility. The CP function selects a new TUPF (TUPF2) that is geographically closer to the current UE location and configures TUPF2 as a new branch of the session. In the process TUPF2 allocates the new IP address/prefix (IP@L2) and sends it to the CP functions. At this point, the UE is not yet involved.

3. The CP function configures one of the intermediate UP nodes as a branching point for the PDU Session. It is possible that the CP may insert a new UP node into the path to act as a branching point. The UP node acting as a branching point may be collocated with other entities, e.g. with RAN. The CP commands switching the uplink path from that using the old uplink path to the new uplink path.

4. The network notifies the UE of the availability of the new IP address/prefix. The UE releases the old IP address/prefix as soon as it configures the use of the new IP address/prefix. This may be performed using an IPv6 Router Advertisement or a control message. The CP commands switching from the first downlink path to the second downlink path.

5. UE starts using IP@L2 for all new traffic and may also proactively move existing traffic flow (where possible) from IP@L1 to IP@L2 by leveraging upper layer mobility mechanisms (e.g. SIP re-INVITE).

6. The CP releases the old branch at TUPF1.

7. The CP releases the branching function. If needed, the branching entity may be removed from the user plane path.

Having now concluded our description of the specific embodiments, we summarize as follows.

Figure 2:
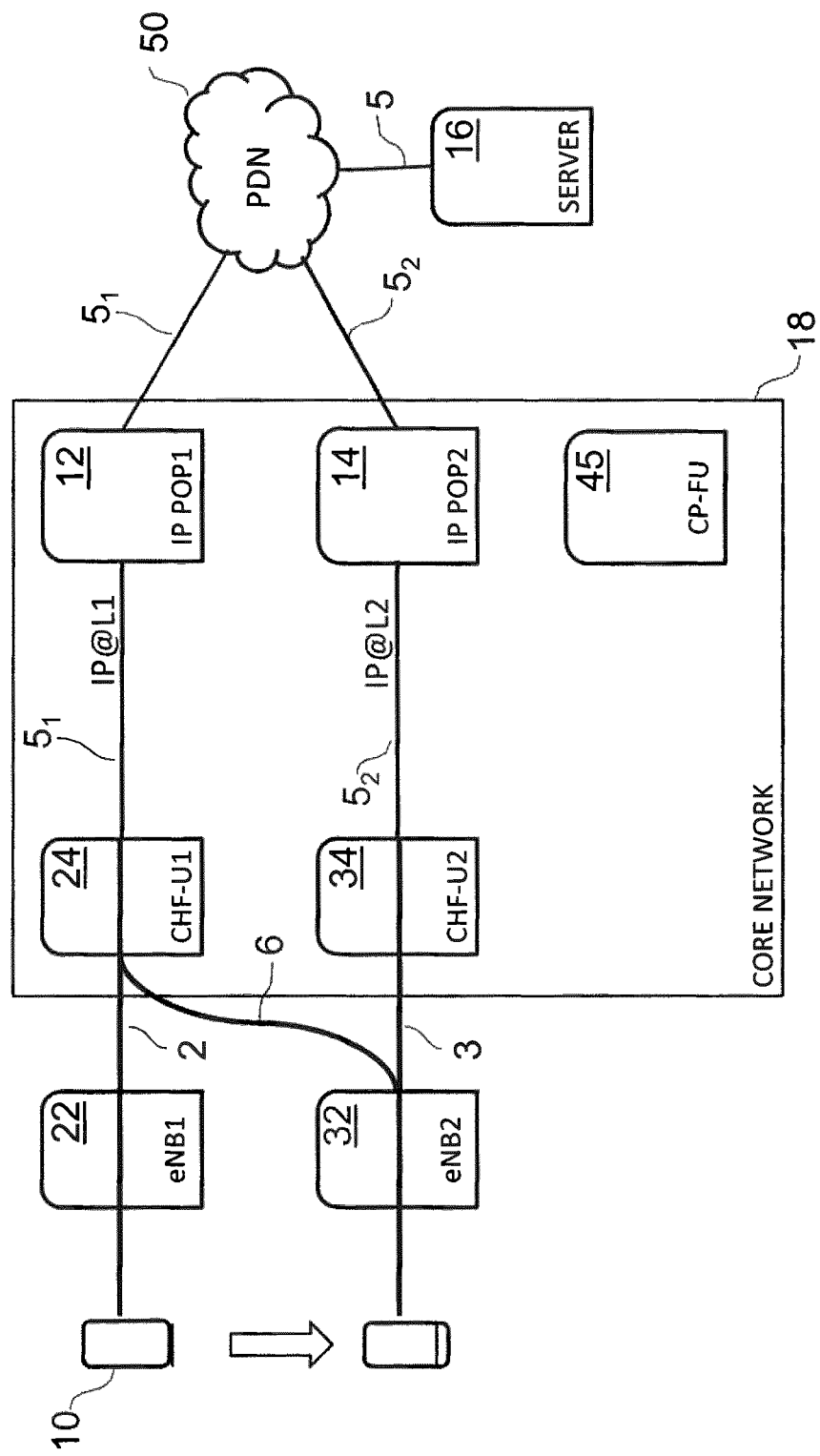
FIG. 2 is a schematic diagram of a system undergoing a prior art method for changing local anchor through CSIPTO.

As has become apparent from the above description of exemplary implementations, the approach is taken of assigning a new (i.e. second) IP address to a user equipment in an ongoing packet data unit session, while maintaining packet data transmission in that session. The new IP address may be brought into commission in stages within the session, with the uplink path being moved first and then the downlink path. This is different from the SIPTO and CSIPTO prior art approaches described above with reference to FIGS. 1 and 2, respectively, which are based on setting up a new session for the new IP address with or without overlap with the old session, i.e. "make-before-break" or "break-before-make".

An advantage of maintaining a single session during change of local anchor is that a common radio bearer can be used throughout, whereas in the two-session "make-before-break" CSIPTO solution of the prior art two radio bearers have to be employed in parallel during the local anchor change procedure, one for the current session and one for the new session.

Another advantage of certain implementations is that they are compatible with IPv4, as well as IPv6, since they do not use the IPv6 feature, whereby a packet data unit session can be associated with multiple IP addresses, i.e. it is still applicable for user equipment running IPv4, since it can be implemented within a single packet data unit session.

In certain implementations, the IP address can be changed from one local anchor to another, for example as a user equipment moves or as the control plane function decides a local anchor change is sensible for some other reason, for example since the user equipment has recently changed, or is about to change, its mode of use from a low data rate to a high data rate or vice versa, either on the uplink, the downlink or both. The technique presented herein can also be performed independently of a handover procedure. An IP address change effected by the claimed solution could take place before or after a handover, or without a handover. For example, if the user equipment moves very rapidly, handover could be performed without change of the IP address, and then the IP address change could be performed subsequently using the claimed solution.

| Ref. Num. | Description | Acronym |
|---|---|---|
| 2 | first communication path | |
| 3 | second communication path | |
| 4 | control plane path | CP path |
| 5 | user plane path | UP path |
| 6 | re-routing user plane path | |
| 10 | User Equipment | UE |
| 12 | first IP POP/first PGW | IP POP 1/PGW 1 |
| 14 | second IP POP/second PGW | IP POP 2/PGW 2 |
| 16 | Internet Application Server | |
| 18 | Core Network/EPC | CN/EPC |
| 22 | First eNB | eNB1 |
| 24 | First UP Node CHF-U | CHF-U1/SGW 1 |
| 32 | Second Base Station eNB | eNB2 |
| 34 | Second UP Node CHF-U | CHF-U2/SGW 2 |
| 45 | CP function unit/MME | CP-FU/MME |
| 50 | Packet Data Network | PDN |

In summary, the above-described embodiments have described a method and corresponding core network component for Internet Protocol—IP—Point of Presence—POP—change for a user equipment in a communication architecture having a user plane for packet data communication of user data and a control plane for controlling the packet data communication. The method comprises the steps of: (a) managing a first communication path in the user plane between a user equipment and a first IP POP having a first IP address, the first communication path having a first uplink path and a first downlink path; (b) deciding in the control plane on an IP POP change to a second communication path in the user plane between the user equipment and a second IP POP having a second IP address, the second communication path having a second uplink path and a second downlink path; and (c) performing in the control plane the IP POP change from the first communication path to the second communication path. The IP POP change is effected by the sub-steps of:
 i. preparing the second communication path;
 ii. switching from the first uplink path to the second uplink path;
 iii. assigning the second IP address to the user equipment;
 iv. activating the second downlink path; and
 v. releasing the first downlink path.

Here it is noted that these sub-steps are described above as being carried out in this order. However, in other embodiments, the order of these sub-steps could be varied. In particular, the assignment of the second IP address to the user equipment could be carried out earlier than recited, in which case a separate command to activate the second downlink path would need to be sent to the user equipment, instead of the user equipment acting immediately to use the second IP address upon receipt thereof. Moreover, it will be understood that in other embodiments the first downlink path need not be released, so this sub-step could be omitted. Other variations in these sub-steps could also be envisaged.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

The invention claimed is:

1. A method for Internet Protocol (IP) Point of Presence (POP) change for a user equipment in a communication architecture, the communication architecture having a user plane for packet data communication of user data and a control plane for controlling the packet data communication, the method comprising:
 managing a first communication path in the user plane between a user equipment and a first IP POP having a first IP address, the first communication path having a first uplink path and a first downlink path;
 deciding, in the control plane, on an IP POP change to a second communication path in the user plane between the user equipment and a second IP POP having a second IP address, the second communication path having a second uplink path and a second downlink path; and
 performing, in the control plane, the IP POP change from the first communication path to the second communication path, wherein the IP POP change is effected by:
 preparing the second communication path;
 switching from the first uplink path to the second uplink path, wherein premature use of the second downlink path is inhibited by firewall settings in the verification entity which are removed as part of the step of switching from the first downlink path to the second downlink path;
 assigning the second IP address to the user equipment;
 activating the second downlink path; and
 releasing the first downlink path.

2. The method of claim 1, wherein, for a temporary period after switching from the first uplink path to the second uplink path during which time the user equipment may be transmitting data packets bearing the first IP address, a filtering entity in the user plane is configured by a control plane command to re-route such uplink data packets to the first IP POP.

3. The method of claim 2, wherein the filtering entity is configured by the control plane command to re-route uplink data packets to the first IP POP based on the uplink data packets carrying the first IP address.

4. The method of claim 2, wherein the filtering entity is configured by the control plane command to re-route uplink data packets to the first IP POP based on the uplink data packets carrying a source IP address of the user equipment.

5. The method of claim 2, wherein the filtering entity is configured by the control plane command to re-route uplink data packets to the first IP POP based on the uplink data packets having at least one header field with a specified content.

6. The method of claim 5, wherein the header field is selected from the group consisting of: source IP address, destination IP address, source transport port, and destination transport port.

7. The method of claim 1, wherein, for a temporary period after switching from the first uplink path to the second uplink path during which time the user equipment may be transmitting data packets bearing the first IP address, a verification entity in the user plane of the core network, which gates the data packets, is configured by a control plane command to allow such uplink data packets to pass.

8. The method of claim 1, wherein the first communication path and the second communication path share a common radio bearer.

9. A core network component for managing Internet Protocol (IP) Point of Presence (POP) change for a user equipment in a communication architecture, the communication architecture having a user plane for packet data communication of user data and a control plane for controlling the packet data communication, the core network component comprising:
  a control plane function unit, the control plane function unit comprising processing circuitry and memory containing instructions executable by the processing circuitry whereby the control plane function unit is operative to:
    manage a first communication path in the user plane between a user equipment and a first IP POP having a first IP address, the first communication path having a first uplink path and a first downlink path;
    decide, in the control plane, on an IP POP change to a second communication path in the user plane between the user equipment and a second IP POP having a second IP address, the second communication path having a second uplink path and a second downlink path; and
    perform, in the control plane, the IP POP change from the first communication path to the second communication path, wherein the IP POP change is effected by:
      preparing the second communication path;
      switching from the first uplink path to the second uplink path, wherein premature use of the second downlink path is inhibited by firewall settings in the verification entity which are removed as part of the step of switching from the first downlink path to the second downlink path;
      assigning the second IP address to the user equipment;
      activating the second downlink path; and
      releasing the first downlink path.

10. The core network component of claim 9, wherein, for a temporary period after switching from the first uplink path to the second uplink path during which time the user equipment may be transmitting data packets bearing the first IP address, a filtering entity in the user plane is configured by a control plane command to re-route such uplink data packets to the first IP POP.

11. The core network component of claim 10, wherein the filtering entity is configured by the control plane command to re-route uplink data packets to the first IP POP based on the uplink data packets carrying the first IP address.

12. The core network component of claim 10, wherein the filtering entity is configured by the control plane command to re-route uplink data packets to the first IP POP based on the uplink data packets carrying a source IP address of the user equipment.

13. The core network component of claim 10, wherein the filtering entity is configured by the control plane command to re-route uplink data packets to the first IP POP based on the uplink data packets having at least one header field with a specified contents.

14. The core network component of claim 13, wherein the header field is selected from the group consisting of: source IP address, destination IP address, source transport port, and destination transport port.

15. The core network component of claim 9, wherein, for a temporary period after switching from the first uplink path to the second uplink path during which time the user equipment may be transmitting data packets bearing the first IP address, a verification entity in the user plane of the core network, which gates the data packets, is configured by a control plane command to allow such uplink data packets to pass.

16. The core network component of claim 9, wherein the first communication path and the second communication path share a common radio access bearer.

* * * * *